(12) United States Patent
Ohishi et al.

(10) Patent No.: US 6,912,083 B2
(45) Date of Patent: Jun. 28, 2005

(54) ASE LIGHT SOURCE, OPTICAL AMPLIFIER AND LASER OSCILLATOR

(75) Inventors: Yasutake Ohishi, Nagoya (JP); Koichi Nakagawa, Tomobe-machi (JP); Terutoshi Kanamori, Mito (JP); Yousuke Hiraki, Hitachinaka (JP)

(73) Assignee: NTT Electronics Corporation, Tokyo (JP)

( * ) Notice: Subject to any disclaimer, the term of this patent is extended or adjusted under 35 U.S.C. 154(b) by 0 days.

(21) Appl. No.: 10/808,572

(22) Filed: Mar. 25, 2004

(65) Prior Publication Data

US 2004/0184820 A1 Sep. 23, 2004

Related U.S. Application Data

(63) Continuation of application No. PCT/JP02/09969, filed on Sep. 26, 2002.

(30) Foreign Application Priority Data

Sep. 26, 2001 (JP) ........................................ 2001-294677

(51) Int. Cl.[7] .................................................. H01S 3/00
(52) U.S. Cl. .................................... 359/333; 359/341.5
(58) Field of Search ............................... 359/333, 341.5

(56) References Cited

U.S. PATENT DOCUMENTS

| 6,476,960 B1 | * | 11/2002 | Traynor et al. | ........ | 359/341.31 |
| 6,563,628 B2 | * | 5/2003 | Kitabayashi et al. | ..... | 359/337.1 |
| 6,731,426 B2 | * | 5/2004 | Yeniay et al. | .......... | 359/341.32 |

FOREIGN PATENT DOCUMENTS

| EP | 1 079 482 | 2/2001 |
| JP | 6-112576 | 4/1994 |
| JP | 10-241429 | 9/1998 |
| JP | 11-330593 | 11/1999 |
| JP | 2002-76483 | 3/2002 |
| JP | 2002-270927 | 9/2002 |
| WO | WO 02/093698 | 11/2002 |

OTHER PUBLICATIONS

D. Bayart et al., "Broadband Optical Fibre Amplification Over 17.7THz Range", *Electronics Letters*, Aug. 31, 2000, vol. 36, No. 18, pp. 1569–1571.

T. Sakamoto, "Optical Amplification Technique for Utilization of All Wavelengths for Optical Communication", *Optronics*, vol. 18, No. 8 (1999), pp. 104–110. (With Translation).

T. Sakamoto et al., "High Gain and Low Noise TDFA for 1500 nm Band Employing Novel High Concentration Doping Technique", *OFC 2000*.

* cited by examiner

*Primary Examiner*—Mark Hellner
(74) *Attorney, Agent, or Firm*—Dickstein Shapiro Morin & Oshinsky LLP

(57) ABSTRACT

An ASE light source offers high outputs even in a wavelength band of 1,490 to 1,525 nm. The ASE light source outputs spontaneous emission light generated from Tm-doped optical fibers. Then, the ASE light source outputs amplified light obtained by using Er-doped optical fibers to amplify the output from the Tm-doped optical fibers and spontaneous emission light generated from the Er-doped optical fibers so that the amplified light and the spontaneous emission light are superimposed on each other.

27 Claims, 16 Drawing Sheets

ASE LIGHT SOURCE, OPTICAL AMPLIFIER AND LASER OSCILLATOR

This application claims priority from Japanese Patent Application Nos. 2001-294677 filed Sep. 26, 2001, which is incorporated hereinto by reference. In addition, this application is a continuation application of International Application No. PCT/JP02/09969 filed Sep. 26, 2002 designating the U.S.

TECHNICAL FIELD

The present invention relates to an ASE light source, an optical amplifier, and a laser oscillator, and more specifically, to a light source used for characteristic evaluations or optical measurements for optical devices, a wide-band ASE light source for wavelength division multiplexing (WDM) transmissions, an optical amplifierused for WDM transmissions, and a wavelength-variable laser oscillator.

BACKGROUND ART

In recent years, with an explosive increase in demand for communications using the Internet, there has been a growing need for increasing the transmission capacity of an optical transmission system for a truck line. Presently, the optical transmission system for the truck line uses a wavelength band of about 1,530 to 1,560 nm (C band), which is an amplified wavelength range of an Er-doped fiber amplifier, as well as a wavelength band of about 1,570 to 1,600 nm (L band). Moreover, to increase the transmission capacity, the use of a different wavelength band has been proposed. Thus, systems using a new wavelength band around 1,470 nm (S band: about 1,470 to 1,530 nm) are researched and developed (refer to T. Sakamoto et al., OFC2000, PD4).

The optical transmission system comprises a large number of optical passive parts such as filters and couplers. During a process of manufacturing these optical passive parts, the parts are inspected for insertion losses or cross talk. For such inspections, a light source is used which can be used over a relatively wide wavelength range in order to make the operation simpler and more efficient. For example, an ASE light source using Er-doped optical fibers is used for optical passive parts used in the above C or L band.

The ASE (Amplified Spontaneous Emission) light source provides as outputs spontaneous emission light of a wide band from optical fibers in which rare earth is doped. The ASE light source using Er-doped light fibers provides high outputs in the C and L bands. It thus offers a power density of about −20 dB/nm, which is required to measure cross talk in a narrow-band filter such as an AWG (Arrayed Waveguide Grating).

FIG. 1 shows the spectrum of a conventional ASE light source. A practical ASE light sources now have a power density of at least −20 dBm/nm in two wavelength bands of 1,440 to 1,490 nm and 1,525 to 1,605 nm. However, in a wavelength band of 1,490 to 1,525 nm, the light source offers a reduced power density and cannot be used for optical measurements. The wavelength of 1,490 to 1,525 nm is expected to be utilized as the WDM transmission technology advances. Accordingly, optical parts required to construct a system must be developed. Furthermore, alight source is required which is used to evaluate the characteristics of the optical parts.

Such a light source is not limited to the ASE type but a wavelength-variable laser may be used. However, the wavelength-variable laser cannot be economically constructed. On the other hand, fiber lasers are economical and easy to manufacture. They thus offer significant advantages to the optical part industry. Moreover, a rare earth-doped optical amplifier has not been put to practical use yet which offers a sufficiently high gain and a sufficiently small noise factor over the above described wide wavelength range. Realization of this amplifier leads to the advancement of the WDM transmission technology.

ASE light sources are known which use Tm-doped optical fibers in the new wavelength band around 1,470 nm. However, these light sources offer only a low output power density and a narrow wavelength range; they do not offer a power density of at least −20 dBm/nm, which is required for measurements in the S, C, and L bands.

It is an object of the present invention to provide an ASE light source that can provide high outputs even in the wavelength band of 1,490 to 1,525 nm, an ASE light source that can continuously cover the S, C, and L bands, an optical amplifier that can operate in the S and C bands, and a laser oscillator that can switch the wavelength between the S band and the C band.

DISCLOSURE OF THE INVENTION

To accomplish this object, the present invention provides an ASE light source that uses rare earth-doped optical fibers as an optical amplification medium. The ASE light source outputs spontaneous emission light from the optical fibers, into which excitation light is introduced, wherein spontaneous emission light generated from Tm-doped optical fibers is inputted to the optical amplification medium.

The ASE light source according to the present invention may comprise first emission means for outputting spontaneous emission light generated from the Tm-doped optical fibers and second emission means for outputting amplified light obtained by using the Er-doped optical fibers to amplify the output from the first emission means and spontaneous emission light generated from the Er-doped optical fibers so that the amplified light and the spontaneous emission light are superimposed on each other.

According to this configuration, the Tm-doped optical fibers and the Er-doped optical fibers are used as an emission amplification medium to make it possible to provide high outputs in a wavelength band of 1,490 to 1,525 nm.

Alternatively, the ASE light source may comprise third emission means for outputting spontaneous emission light generated from the Er-doped optical fibers and first multiplexing means for multiplexing the output from the second emission means and an output from the third emission means to provide a multiplexed output.

According to this configuration, the Tm-doped optical fibers and the Er-doped optical fibers are used as an emission amplification medium to enable the S, C, and L bands to be continuously covered.

The ASE light source according to the present invention may comprise first emission means for outputting spontaneous emission light generated from the Tm-doped optical fibers, second emission means for outputting amplified light obtained by using the Er-doped optical fibers to amplify one of the outputs from the first emission means and spontaneous emission light generated from the Er-doped optical fibers so that the amplified light and the spontaneous emission light are superimposed on each other, and multiplexing means for multiplexing the other output from the first emission means and the output from the second emission means to provide a multiplexed output.

On the other hand, the present invention provides an optical amplifier which uses rare earth-doped optical fibers as an optical amplification medium and which introduces signal light and excitation light into the optical amplification medium to amplify the signal light. The optical amplifier comprises first amplifying means for using Er-doped optical fibers to amplify the signal light and then output the amplified signal light and second amplifying means for using Tm-doped optical fibers to amplify the output from the first amplifying means and then output the amplified output.

According to this configuration, the Tm-doped optical fibers and the Er-doped optical fibers are used as an amplification medium to make it possible to realize an optical amplifier that offers a high gain at a wavelength of 1,510 to 1,525 nm, while reducing noise.

A laser oscillator according to the present invention comprises an optical amplifier having first amplifying means for using Er-doped optical fibers to amplify signal light and then output the amplified signal light and second amplifying means for inputting the output from the first amplifying means to Tm-doped optical fibers to amplify the output from the first amplification means using excitation light and then output the amplified output; a filter connected to an output of the optical amplifier; and splitting means connected to an output of the filter to input one of its outputs to the optical amplifier.

According to this configuration, a laser oscillator can be realized which can switch the wavelength between the S band and the C band.

BEST MODE FOR CARRYING OUT THE INVENTION

Embodiments of the present invention will be described below in detail with reference to the drawings.

Figure 1:
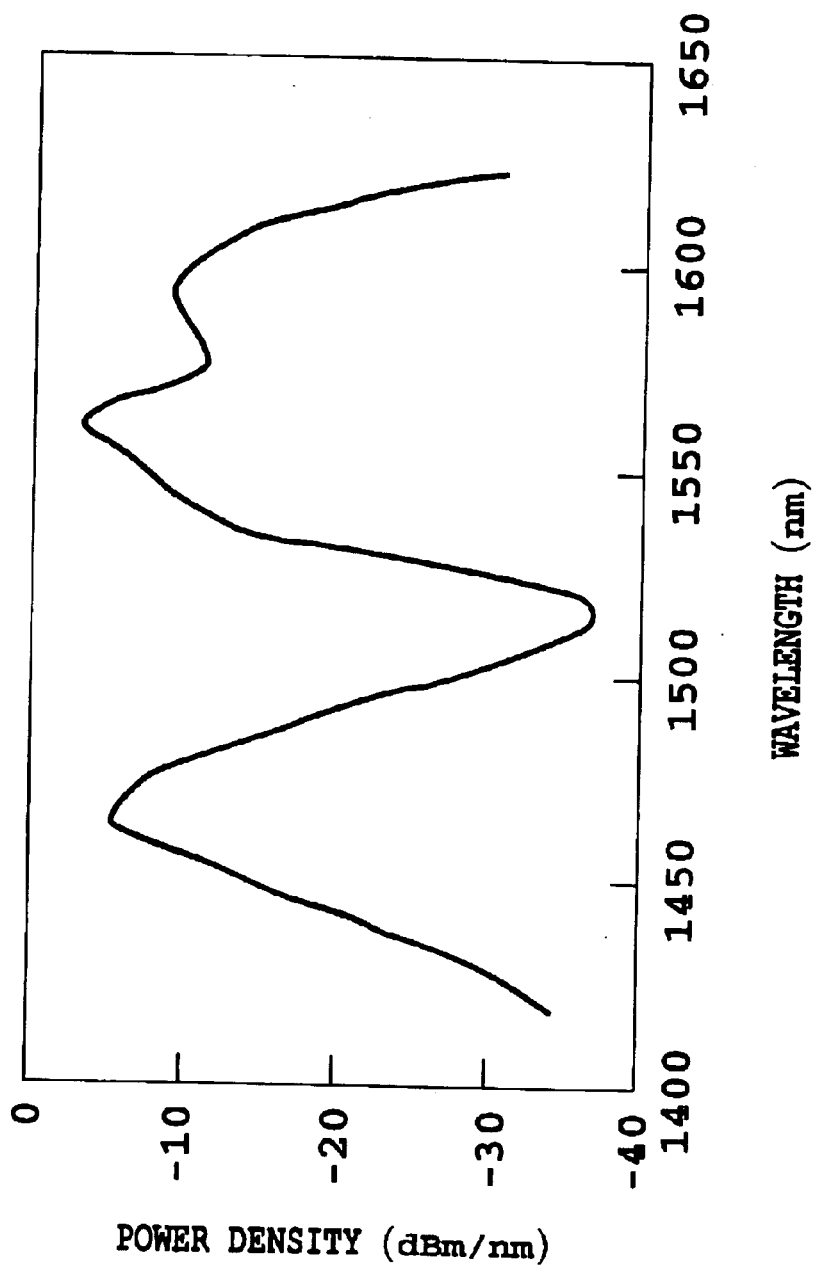
FIG. 1 is a graph showing the spectrum of a conventional ASE light source.
Figure 2:
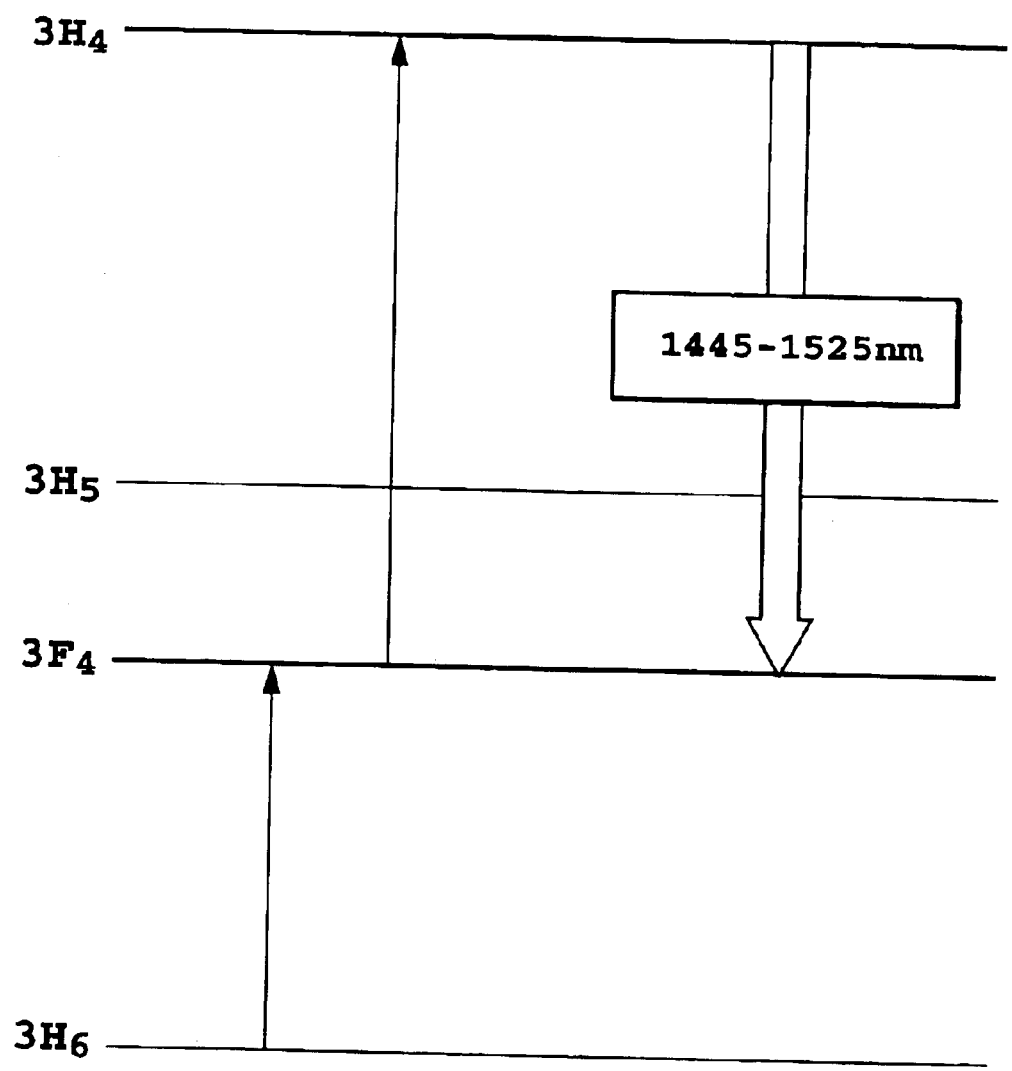
FIG. 2 is a diagram showing the energy level structure of an excitation light source.

FIG. 2 is the energy level structure of an excitation light source. In the present embodiment, an excitation light source that excites Tm-doped optical fibers uses excitation light in which output excitation light has a wavelength corresponding to the energy between a $^3F_4$–$^3H_4$ level for Tm ions and corresponding to the energy between a $^3H_6$–$^3F_4$ level, or output excitation light with a wavelength band of 1,360 to 1,445 nm.

In the present embodiment, an ASE light source inputs ASE light generated from Tm-doped optical fibers to Er-doped optical fibers in which a $^4I_{11/2}$ level or a $^4I_{13/2}$ level has been excited. ASE light emitted from the Tm-doped optical fibers is amplified. Then, the amplified ASE light and ASE light generated from the Er-doped optical fibers are superimposed on each other. Not only plural beams of ASE light are superimposed on each other by an optical multiplexer but of the ASE light emitted from the Tm-doped optical fibers, an ASE light component with a wavelength band of 1,500 to 1,525 nm is also amplified by the Er-doped optical fibers. In the ASE light source, the Tm-doped optical fibers and the Er-doped optical fibers can be arranged in series as an amplification medium.

Furthermore, to smooth ASE optical spectrum in the L band, Er-doped optical fibers with different hosts, specifically, ASE light generated from quartz optical fibers and tellurite optical fibers is superimposed on ASE light emitted from the Tm-doped optical fibers. Moreover, by bidirectionally exciting the Tm-doped optical fibers at the same wavelength and at different intensities, it is possible to reduce the wavelength dependency of ASE light of a waveband of 1,450 to 1,525 nm.

Furthermore, to reduce the wavelength dependency on light intensity of ASE light obtained from the Tm-doped optical fibers and having a wavelength of 1,445 to 1,525 nm, it is preferable in a practical sense to set the product (hereinafter referred to as the concentration length product) of a Tm concentration and a fiber length at 30,000 to 100,000 ppm·m.

[ASE Light Source According to First Embodiment]

Figure 3:
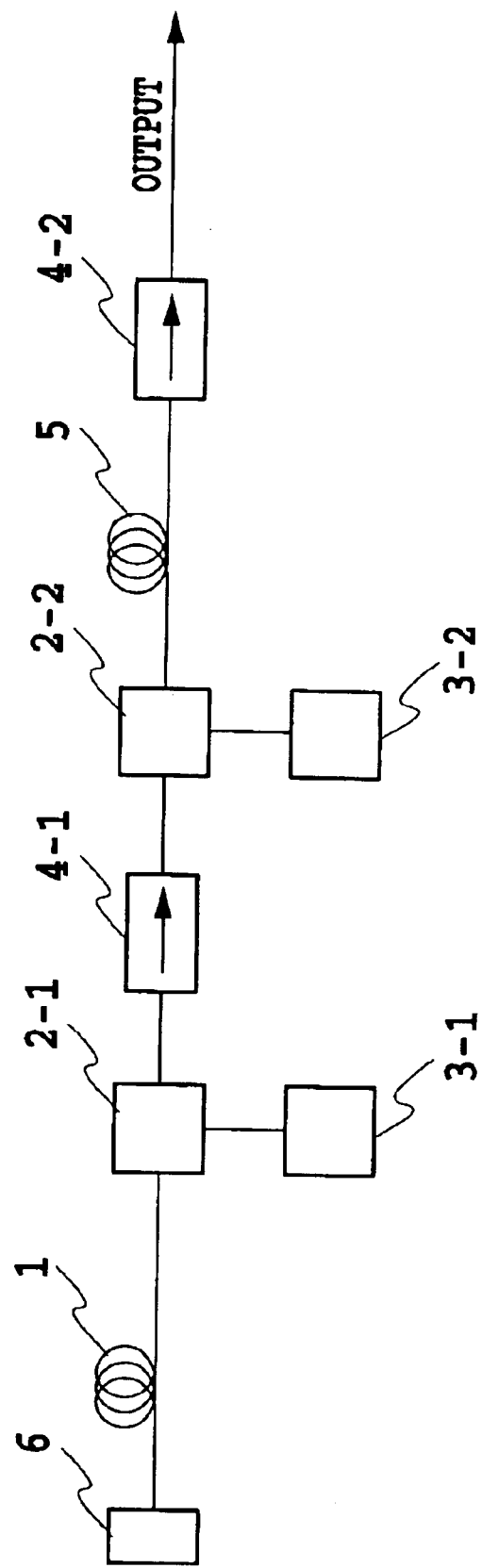
FIG. 3 is a diagram showing the configuration of an ASE light source according to a first embodiment of the present invention.

FIG. 3 shows the configuration of an ASE light source according to a first embodiment of the present invention. A reflector 6, Tm-doped optical fibers 1, a multiplexer 2-1, an optical isolator 4-1, a multiplexer 2-2, Er-doped optical fibers 5, and an optical isolator 4-2 are sequentially connected together in series. An excitation light source 3-1 is connected to the multiplexer 2-1 so as to input excitation light to the Tm-doped optical fibers 1. An excitation light source 3-2 is connected to the multiplexer 2-2 so as to input excitation light to the Er-doped optical fibers 5. The multiplexers 2-1 and 2-2 may be replaced with optical circulators.

With this configuration, ASE light of the S band generated from the Tm-doped optical fibers 1 is inputted to the Er-doped optical fibers 5. The incident ASE light is amplified, and the amplified ASE light and ASE light generated from the Er-doped optical fibers 5 are superimposed on each other. Consequently, the ASE optical spectrum of the whole optical output can continuously cover the S and C bands.

The Tm-doped optical fibers 1 are composed of a Zr-based fluoride and contain 6,000 ppm of Tm doped in a core. The Tm-doped optical fibers 1 have a fiber length of 13 m. To allow the ASE optical spectrum of the S band to have a wide band characteristic, it is preferable in a practical sense that the concentration length product is 30,000 to 100,000 ppm·m. However, when the Tm concentration is excessively increased to set the concentration length product to within the above range, concentration quenching may occur to reduce the emission efficiency of Tm. Therefore, the Tm concentration is desirably at most 10,000 ppm. Furthermore, a decrease in Tm concentration requires the fiber length to be increased. This is disadvantageous in manufacturing costs. In view of these points, the practical Tm concentration is 1,000 to 8,000 ppm in a practical sense.

The excitation light source 3-1 is a semiconductor laser of wavelength 1,400 nm. The excitation wavelength may be selected to be between 1,360 and 1,445 nm. This is shorter than the wavelength of ASE light and is a limit wavelength on a short wavelength side at the $^3H_4$ level of Tm ions. A wavelength with a particularly high excitation efficiency is between 1,380 and 1,409 nm.

The reflector 6 is not an essential component and can have its spectrum shape varied by setting reflectivity to have a value of 0 to 10%. The reflector 6 reflects ASE light emitted from the left end of the Tm-doped optical fiber 1 and excitation light that has not been absorbed by the Tm-doped optical fiber 1. The reflected light is amplified in the Tm-doped optical fiber 1 again. Thus, the excitation light is absorbed to enable the ASE light to be efficiently enhanced.

With the Tm-doped optical fiber 1, the reflector 6 reflects light of a 1,450-nm band. Then, for the reflected light, an induced transition from $^3H_4$ level to $^3F_4$ level occurs in the Tm-doped optical fiber 1 to increase the excitation density of the $^3F_4$ level. Accordingly, a $^3F_4$ to $^3H_4$ absorption transfer is likely to occur. As a result, in the ASE optical spectrum of the S band, short wavelength components around the 1,450-nm band are weakened. On the other hand, long wavelength components of a 1,500-nm band are unlikely to be affected by the $^3F_4$ to $^3H_4$ absorption transition. These components are amplified in the Tm-doped optical fiber 1 to increase their light intensities. Therefore, the reflector 6 can be effectively installed if it is desirable to enhance the long wavelength components of ASE optical spectrum of the S band.

The light intensity of a short wavelength band close to the 1,450-nm band can be increased by avoiding installing the reflector 6 and opening one end of the Tm-doped optical fibers 1 even with the occurrence of a small amount of reflection or applying a nonreflective treatment such as the angular polishing of the fiber facets or the application of a nonreflective coat film.

Er-doped optical fibers 5 are composed of Er quartz and contain 500 ppm of Er doped in a core. The Er-doped optical fibers 5 have a fiber length of 20 m. When the reverse distribution between a $^4I_{13/2}$ level and a $^4I_{15/2}$ level of Er ions is close to 100%, the Er-doped optical fibers 5 can have a positive gain even in a wavelength band of 1,500 to 1,525 nm. To realize a reverse distribution close to 100%, a semiconductor laser having a wavelength that can excite the $^4I_{11/2}$ level of Er, that is, an oscillation wavelength in a 980-nm band is used as the excitation light source 3-2. The excitation light source 3-2 excites the Er-doped optical fibers 5 at a sufficiently high intensity of about 150 mW.

ASE light emitted from the Tm-doped optical fibers 1 has its power density reduced to −20 dBm/nm or less in a long wavelength band of at least 1,515 nm. However, ASE light emitted from the Tm-doped optical fibers 1 is amplified to have its intensity increased. Its power intensity in a wavelength band of 1,510 to 1,530 nm is at least −10 dBm/nm.

Figure 4:
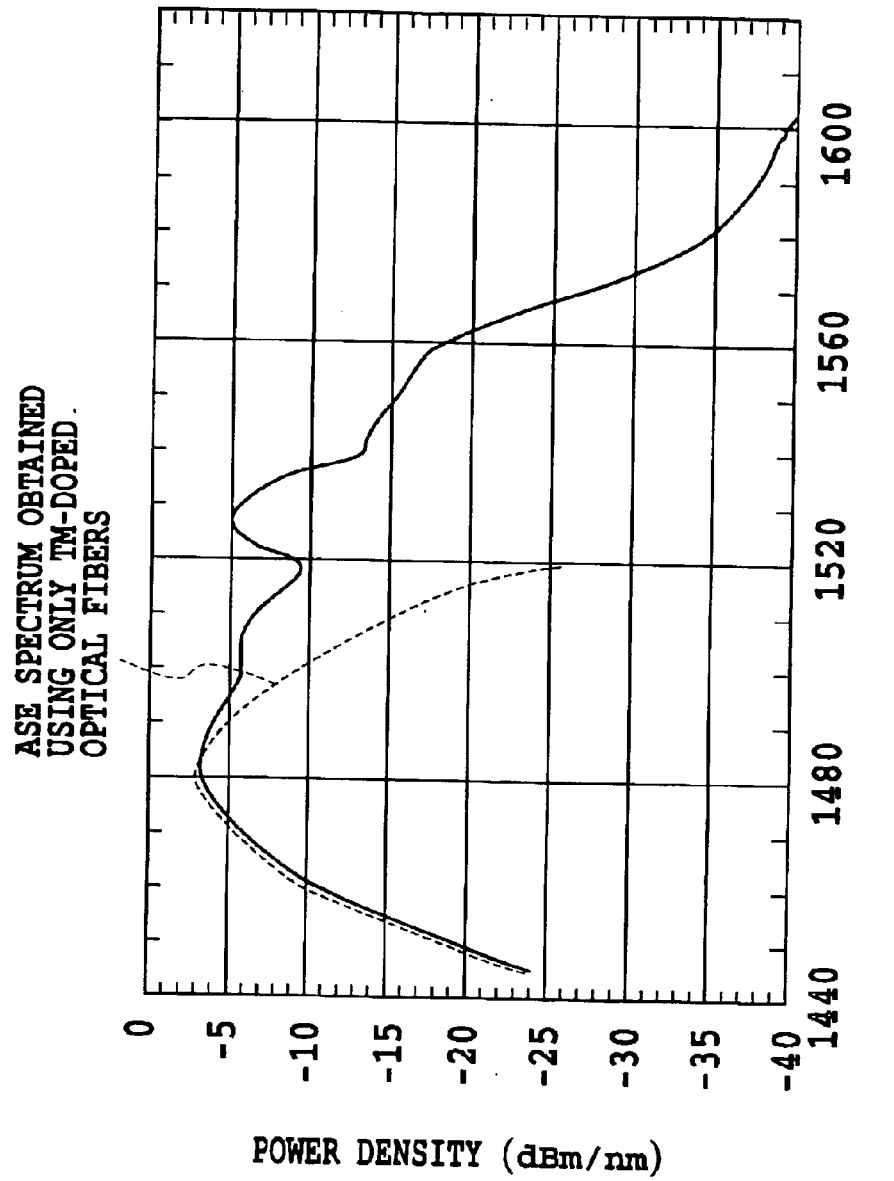
FIG. 4 is a graph showing the output spectrum of the ASE light source according to the first embodiment of the present invention.
Figure 5:
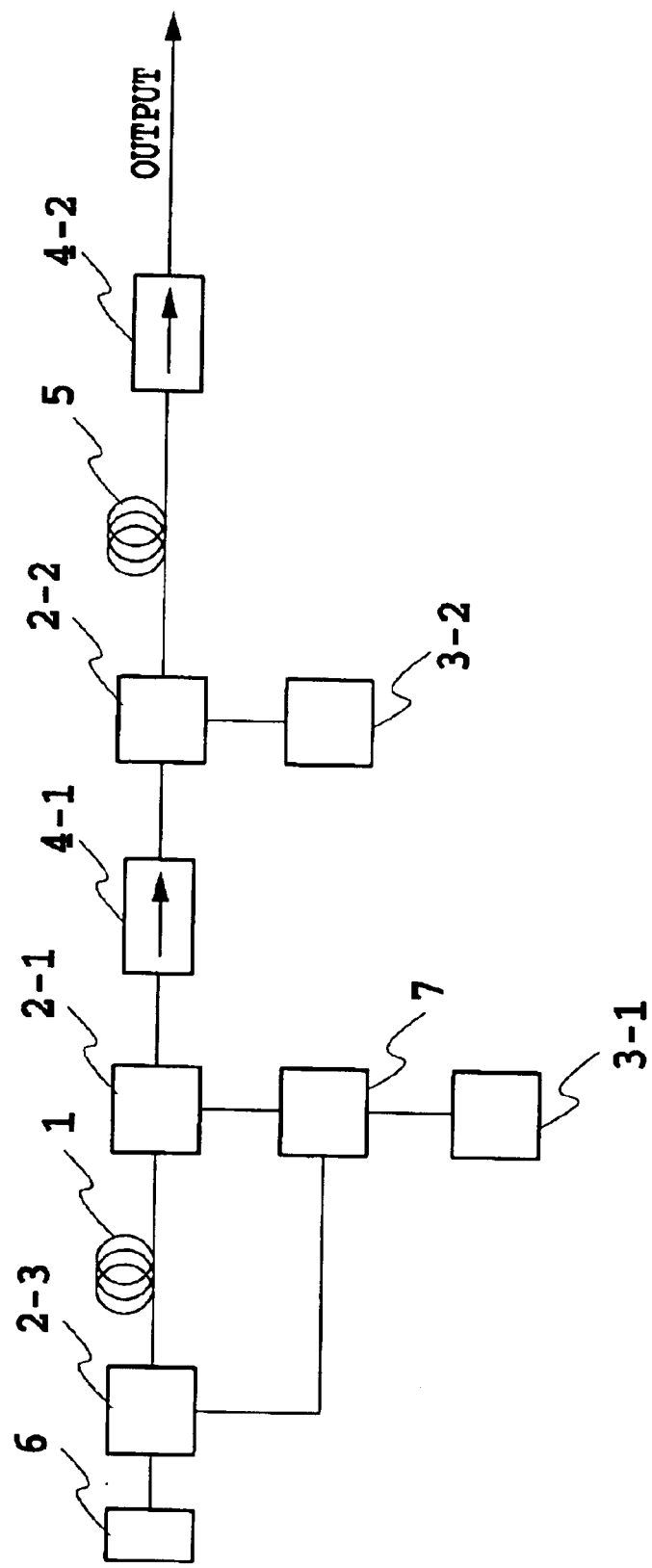
FIG. 5 is a diagram showing the configuration of an ASE light source according to a second embodiment of the present invention.

FIG. 4 shows the output spectrum of the ASE light source according to the first embodiment of the present invention. The power density of this light source is at least −20 dBm/nm in a wavelength band of 1,450 to 1,565 nm. If the optical amplification action of the Er-doped optical fibers 5 is not utilized, that is, only the Tm-doped optical fibers 1 are utilized, the ASE optical spectrum has a power density of at least −20 dBm/nm. However, in the present embodiment, a wavelength band with a power density of at least 20 dBm/nm can be increased to 1,565 nm.

Taps interposed between the optical isolator 4-1 and the multiplexer 2-2 and after the optical isolator 4-2 are used to extract part of the ASE optical output. A photo detector receives light to monitor an output light intensity. For stabilized ASE optical outputs, each monitor output is fed back to drive the excitation light sources 3-1 and 3-2. In this case, an optical filter that allows only light of a wavelength band of 1,530 to 1,570 nm to pass through is added to the tap installed after the optical isolator 4-2. This enables light emitted from the Er-doped optical fibers 5 to be mainly monitored. In this manner, variations in total optical output can be reduced to ±0.01 dB or less. If such feed back control is not provided, the total optical output variation is almost ±0.03 dB and also depends on environment temperature.

[ASE Light Source According to Second Embodiment]

FIG. 2 shows the configuration of an ASE light source according to a second embodiment of the present invention. The second embodiment is the same as the first embodiment except that the Tm-doped optical fibers 1 in the ASE light source according to the first embodiment are bidirectionally excited. A splitter 7 splits excitation light outputted from the excitation light source 3-1 so that an intensity ratio is 5% to 95%. The total quantity of excitation light is 250 mW. Thus, 5% of the excitation light is incident on the Tm-doped optical fibers 1 via the multiplexer 2-3 (this excitation will hereinafter be referred to as front excitation). 95% of the excitation light is incident on the Tm-doped optical fibers 1 via the multiplexer 2-1 (this excitation will hereinafter be referred to as rear excitation).

Figure 6:
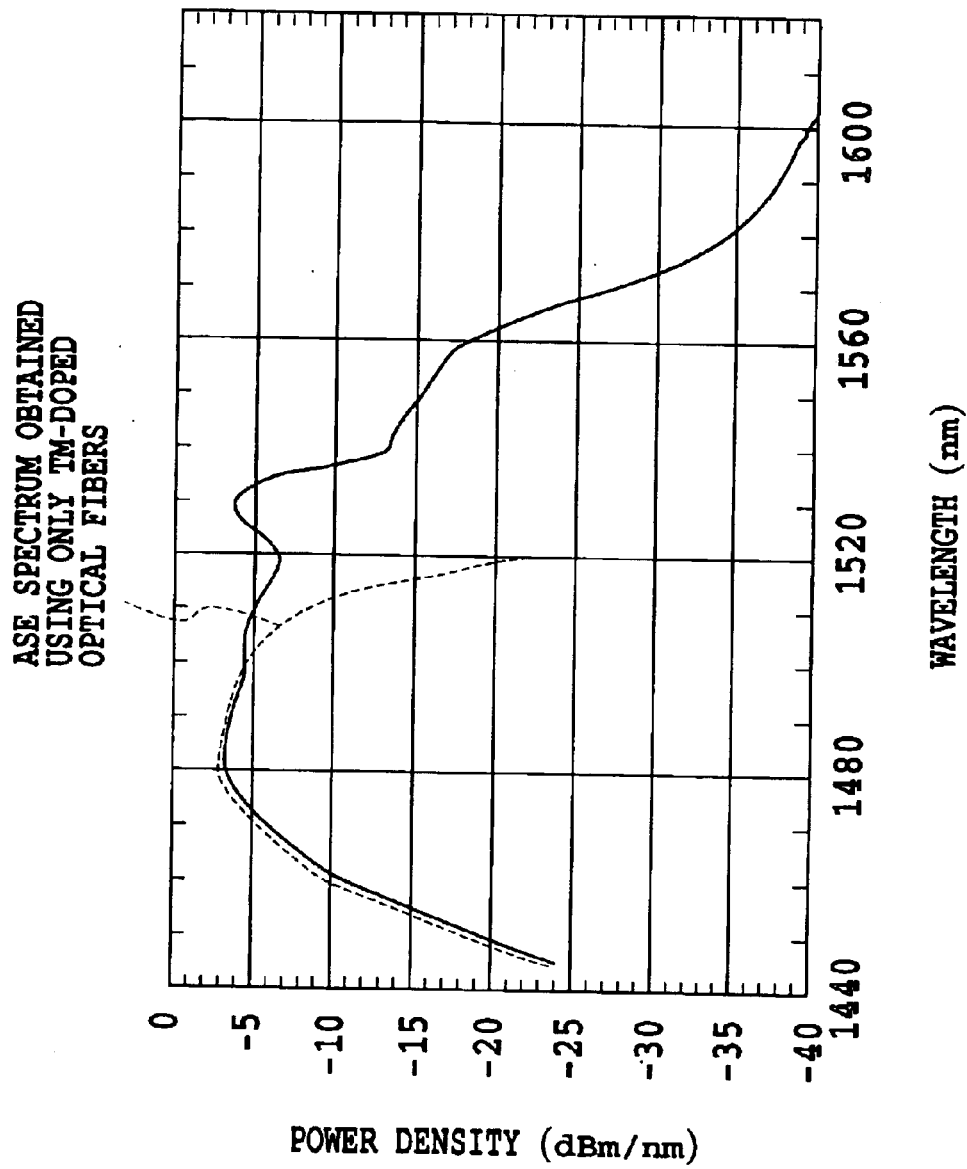
FIG. 6 is a graph showing the output spectrum of the ASE light source according to the second embodiment of the present invention.

FIG. 6 shows the output spectrum of the ASE light source according to the second embodiment. The above described bidirectional excitation method makes it possible to reduce the wavelength dependence of an ASE optical spectrum emitted from the Tm-doped optical fibers 1 as shown in FIG. 6. Specifically, by allowing excitation light to enter the Tm-doped optical fibers 1 via the multiplexer 2-3, it is possible to increase the power density close to the 1,500-nm band to reduce the wavelength dependence of the ASE optical spectrum, compared to the casein which the excitation light is not incident on the Tm-doped optical fibers 1. The power density of an ASE optical spectrum obtained utilizing only the Tm-doped optical fibers 1 is at least −10 dB/nm in a wavelength band of 1,460 to 1,510 nm and at least −20 dB/nm in a wavelength band of 1,450 to 1,518 nm.

When the light intensity of the front excitation is excessively increased, the reverse distribution between the $^3H_4$–$^3F_4$ level of Tm ions is degraded to reduce the power density close to the 1,460-nm band, while increasing the power density close to the 1,500-nm band. That is, the ASE optical spectrum is shifted to the long wavelength side. To prevent such a shift to the long wavelength side, it is desirable to set the light intensity of the front excitation to be lower than that of the rear excitation. The preferable split ratio is 3 to 30% to 97 to 70%.

According to the second embodiment, it is possible to provide a power density of at least −20 dBm/nm in a wavelength band of 1,450 to 1,565 nm. Accordingly, the wavelength dependence of the spectrum of a wavelength band of 1,480 to 1,520 nm can be reduced compared to the first embodiment. In the second embodiment, the single excitation light source 3-1 excites the Tm-doped optical fibers 1. However, two or more excitation light source may be used to carry out bidirectional excitation. Furthermore, although quartz-based optical fibers are used as the Er-doped optical fibers 5, fluoride or tellurite optical fibers may be used. In this case, excitation light offers a high excitation efficiency at a wavelength close to 970 nm (±5 nm).

[ASE Light Source According to Third Embodiment]

Figure 7:
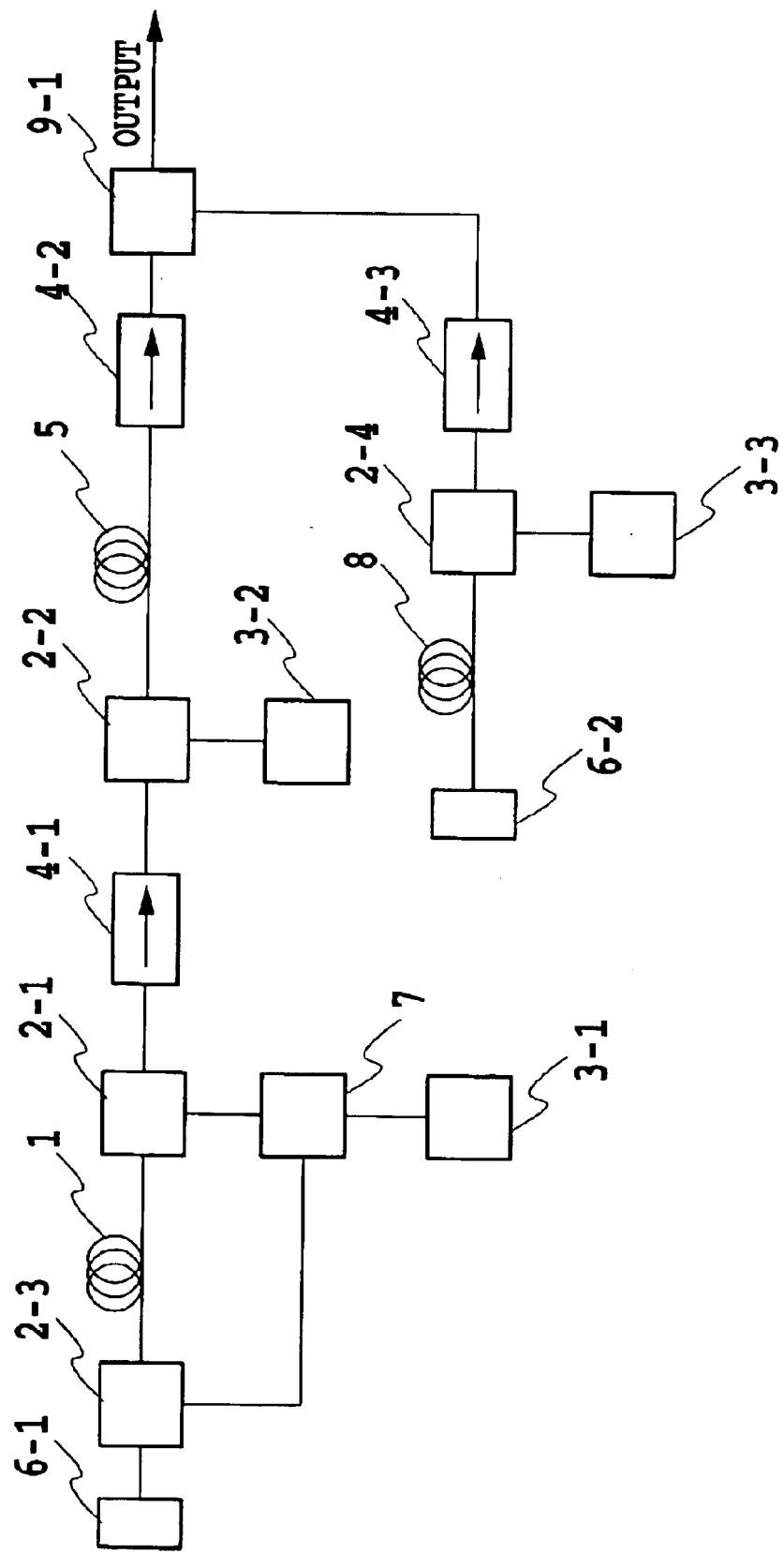
FIG. 7 is a diagram showing the configuration of an ASE light source according to a third embodiment of the present invention.

FIG. 7 shows the configuration of an ASE light source according to a third embodiment of the present invention. In this ASE light source, an optical multiplexer 9-1 is connected to an optical output port of the ASE light source according to the second embodiment. An optical isolator 4-3, an optical multiplexer 2-4, Er-doped optical fibers 8, and a reflector 6-2 are sequentially connected to the other input to the optical multiplexer 9-1. An excitation light source 3-3 is connected to the multiplexer 2-4.

The optical multiplexer 9-1 may be composed of, for example, a 3-dB coupler having a low wavelength dependency. The Er-doped optical fibers 8 are Er-doped tellurite optical fibers 5 having an Er dope concentration of 1,000 ppm and a fiber length of 5 m. The Er-doped optical fibers 8 may also be Er-doped fluoride or quartz-based optical fibers. The excitation light source 3-3 is a semiconductor laser having an oscillation wavelength of 1,480 nm and a quantity of excitation light of 130 mW.

Figure 8:
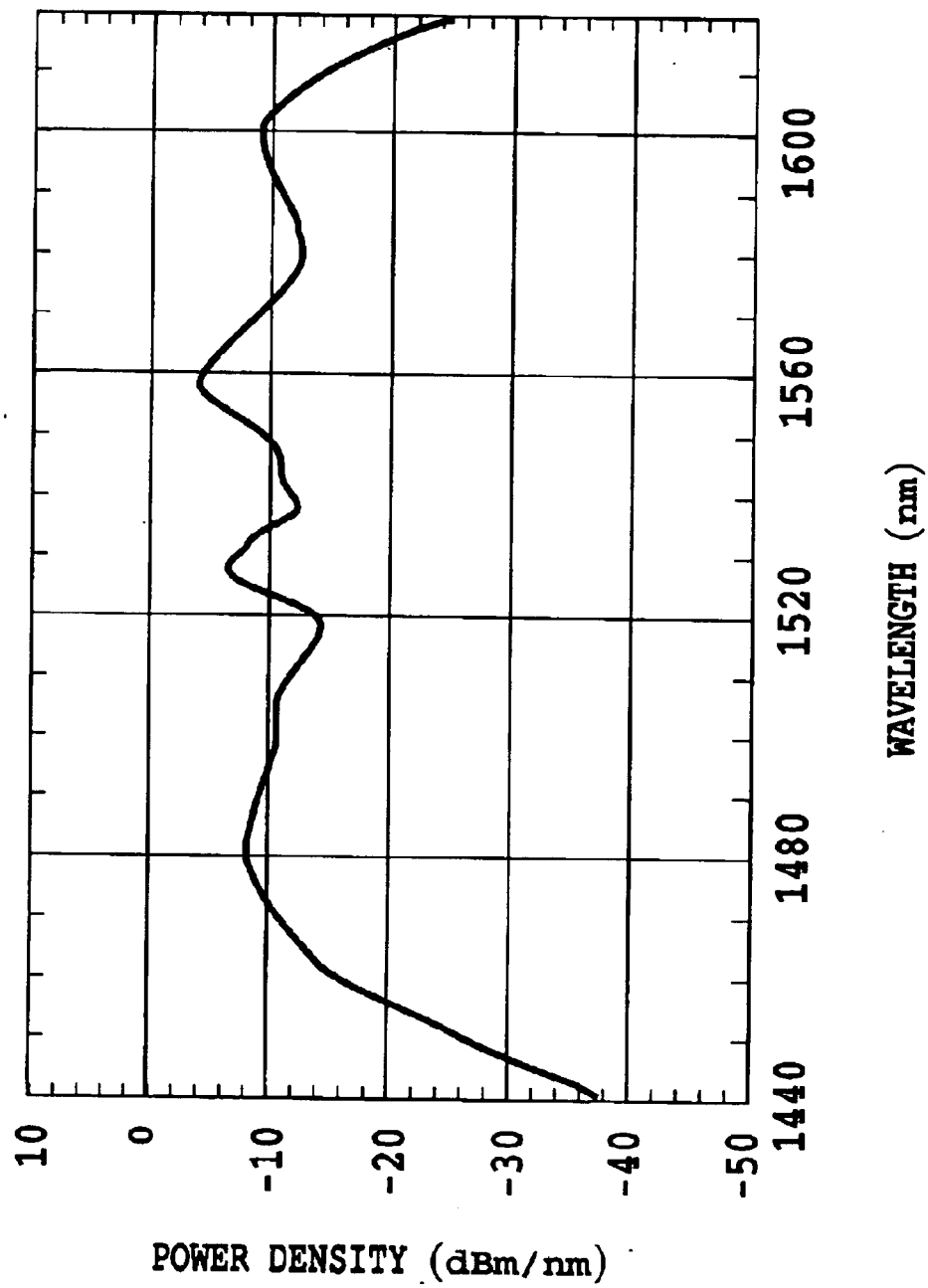
FIG. 8 is a graph showing the output spectrum of the ASE light source according to the third embodiment of the present invention.

FIG. 8 shows the output spectrum of the ASE light source according to the third embodiment. This ASE light source offers a power density of at least −20 dBm/nm in a 163-nm wavelength band of 1,455 to 1,618 nm. It can continuously cover the S, C, and L bands. The use of a 3-dB coupler as the optical multiplexer 9-1 enables two optical output ports to be used to obtain two independent beams of ASE light having the same spectrum. This is efficient in applications to optical measurements.

[ASE Light Source According to Fourth Embodiment]

Figure 9:
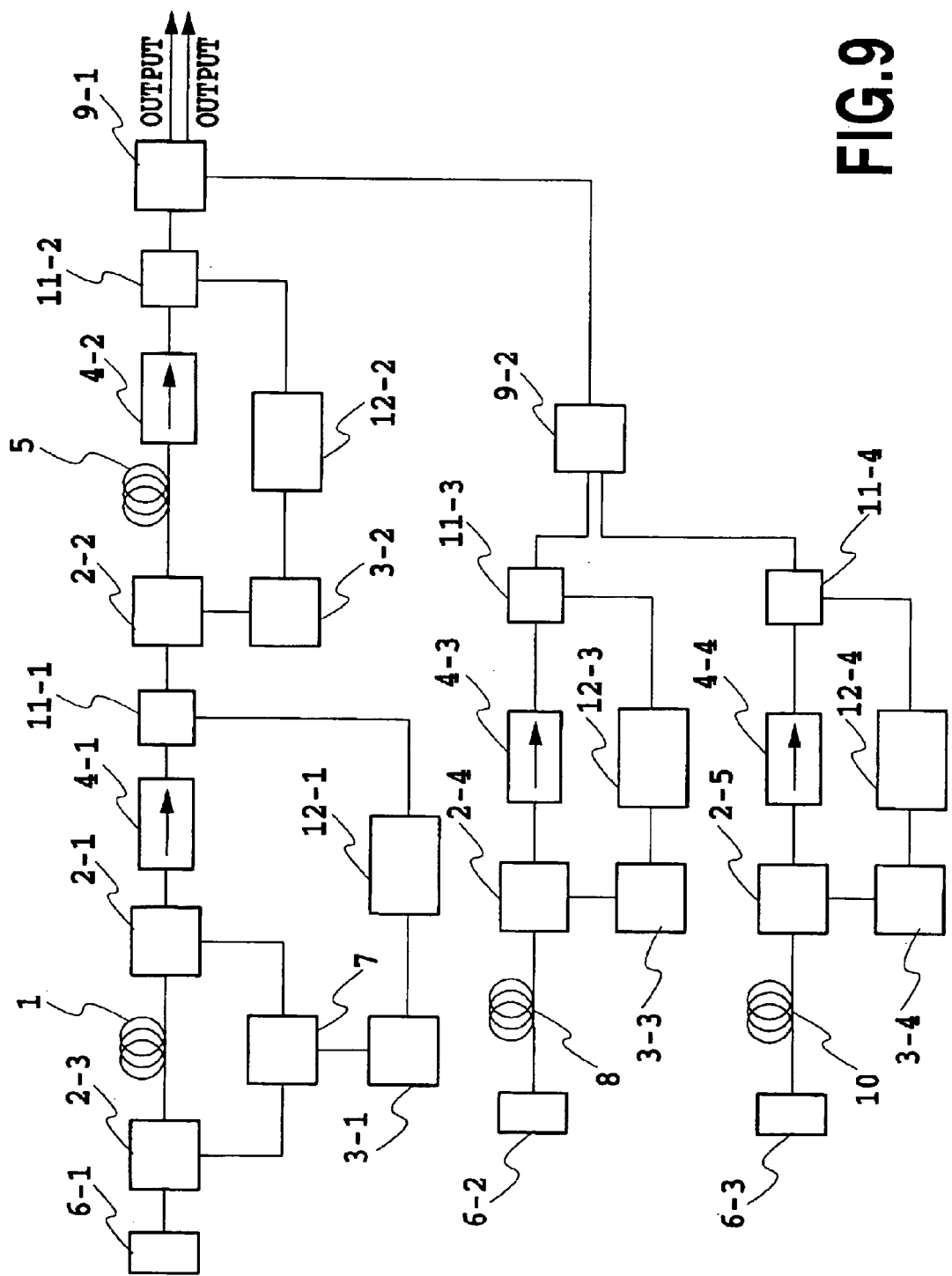
FIG. 9 is a diagram showing the configuration of an ASE light source according to a fourth embodiment of the present invention.

FIG. 9 shows the configuration of an ASE light source according to a fourth embodiment of the present invention. The fourth embodiment improves the shape of the ASE optical spectrum obtained from the ASE light source according to the third embodiment. Specifically, the ASE optical spectrum obtained according to the third embodiment, shown in FIG. 8, has a large recess over a wavelength range of 1,560 to 1,600 nm. This is because the Er-doped tellurite optical fibers are used as an emission medium. The ASE optical spectrum desirably has as insignificant wavelength dependence as possible, that is, it is desirably flat.

An ASE light source composed of a reflector 6-3, Er-doped optical fibers 10, an optical multiplexer 2-5, an excitation light source 3-4, and an optical isolator 4-4 are connected together by inserting an optical multiplexer 9-2 between the optical multiplexer 9-1 and optical isolator 4-3 of the ASE light source according to the third embodiment. ASE light from the Er-doped optical fibers 10 has a higher power density in a wavelength band of 1,560 to 1,600 nm that ASE light from the Er-doped tellurite optical fibers. Accordingly, the spectrum of a wavelength band of 1,570 to 1,600 nm can be smoothed by synthesizing the spectra of the ASE light from the Er-doped optical fibers 10 and Er-doped tellurite optical fibers. The Er-doped optical fibers 10 maybe composed of a fluoride.

Figure 10:
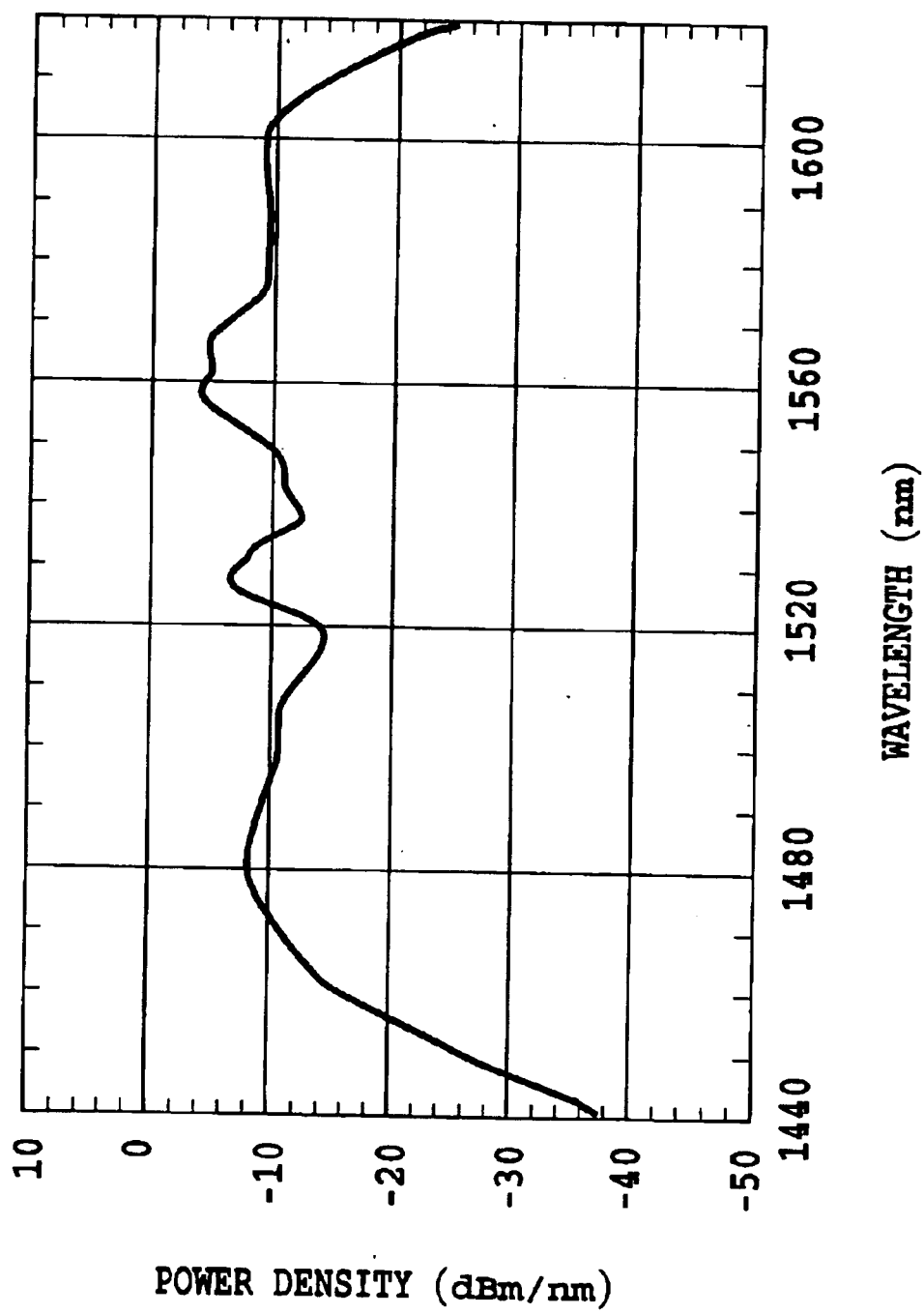
FIG. 10 is a graph showing the output spectrum of the ASE light source according to the fourth embodiment of the present invention.

FIG. 10 shows the output spectrum of the ASE light source according to the fourth embodiment of the present invention. This figure indicates that the spectrum of the wavelength of 1,570 to 1,600 nm has been smoothed compared to the output spectrum of the ASE light source according to the third embodiment, shown in FIG. 8.

In the present embodiment, taps 11-1 to 11-4 are installed at the outputs of the respective optical isolators 4-1 to 4-4 to extract part of the optical outputs from the Tm-doped optical fibers 1 and Er-doped optical fibers 5, 8, and 10, respectively. Excitation light source control sections 12-1 to 12-4 monitor these optical outputs. For stabilized ASE optical outputs, each monitor output is fed back to drive the excitation light sources 3-1 to 3-4. As a result, variations in total optical output from the optical multiplexer 9-1 can be reduced to ±0.01 dB or less.

[ASE Light Source According to Fifth Embodiment]

Figure 11:
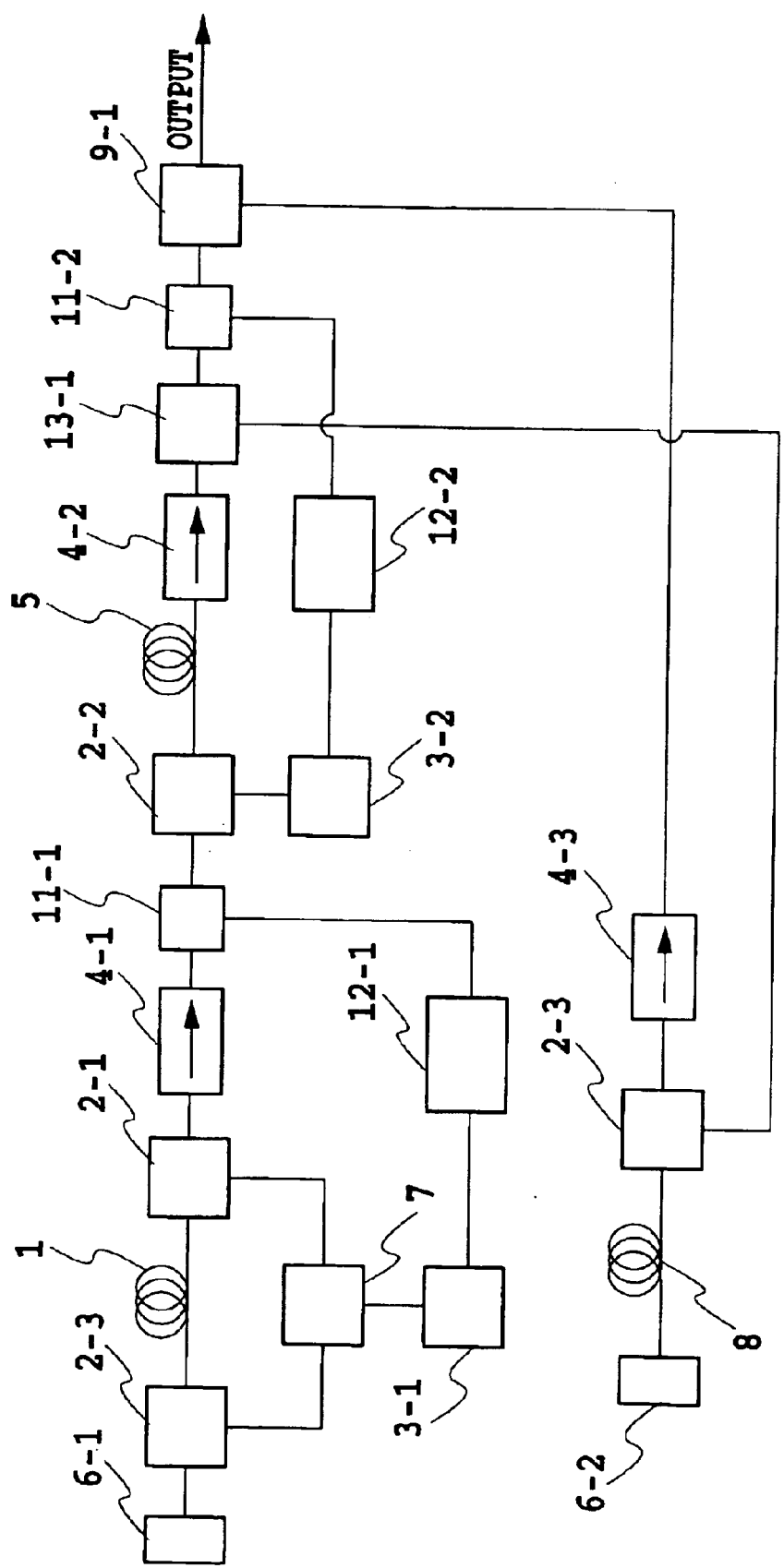
FIG. 11 is a diagram showing the configuration of an ASE light source according to a fifth embodiment of the present invention.

FIG. 11 shows the configuration of an ASE light source according to a fifth embodiment of the present invention. The fifth embodiment economizes the ASE light source according to the third embodiment. The number of excitation light sources, which are the most expensive among the parts constituting the ASE light source, is reduced from three according to the third embodiment to two. The excitation light source 3-2 is changed from the semiconductor laser with the 980-nm band to a semiconductor laser with a 1,430-nm band. Excitation light of wavelength 1,430 nm can excite the $^4H_{13/2}$ level of Er ions. This excitation enables ASE light of the S band generated from the Tm-doped optical fibers 1 to be amplified in the Er-doped optical fibers 5. The amplified ASE light of the S band is superimposed on ASE light generated from the Er-doped optical fibers 5.

In this case, part of excitation light of wavelength 1,430 nm passes through the Er-doped optical fibers 5 without being absorbed by them. An optical splitter 13-1 separates and extracts only the passing excitation light from ASE light with a wavelength longer than 1,445 nm. The extracted light is incident on the multiplexer 2-3 and then used as excitation light for the Er-doped optical fibers 8. Then, the optical multiplexer 9-1 multiplexes ASE light generated from the Er-doped optical fibers 8 and ASE light separated by the optical splitter 13-1 from the excitation light of wavelength 1,430 nm and covering the Sand C bands, to obtain the total optical output. As a result, ASE light is obtained which continuously covers the S, C, and L bands. This ASE light has a power density of at least −20 dBm/nm in a 163-nm wavelength band of 1,455 to 1,618 nm as well as a total optical output variation of at most ±0.01 dB.

The Er-doped optical fibers 8 are composed of tellurite. However, Er-doped fluoride or quartz optical fibers may be used. In the present embodiment, the excitation light source 3-2 has a wavelength of 1,430 nm. However, the present invention is not limited to this aspect. It is necessary for the excitation wavelength that the wavelengths of ASE lights of the S, C, and L bands are not superimposed on one another and that the excitation light can excite the $^4I_{13/2}$ level of Er ions. Therefore, light of wavelength 1,350 to 1,445 nm can be utilized.

[ASE Light Source According to Sixth Embodiment]

Figure 12:
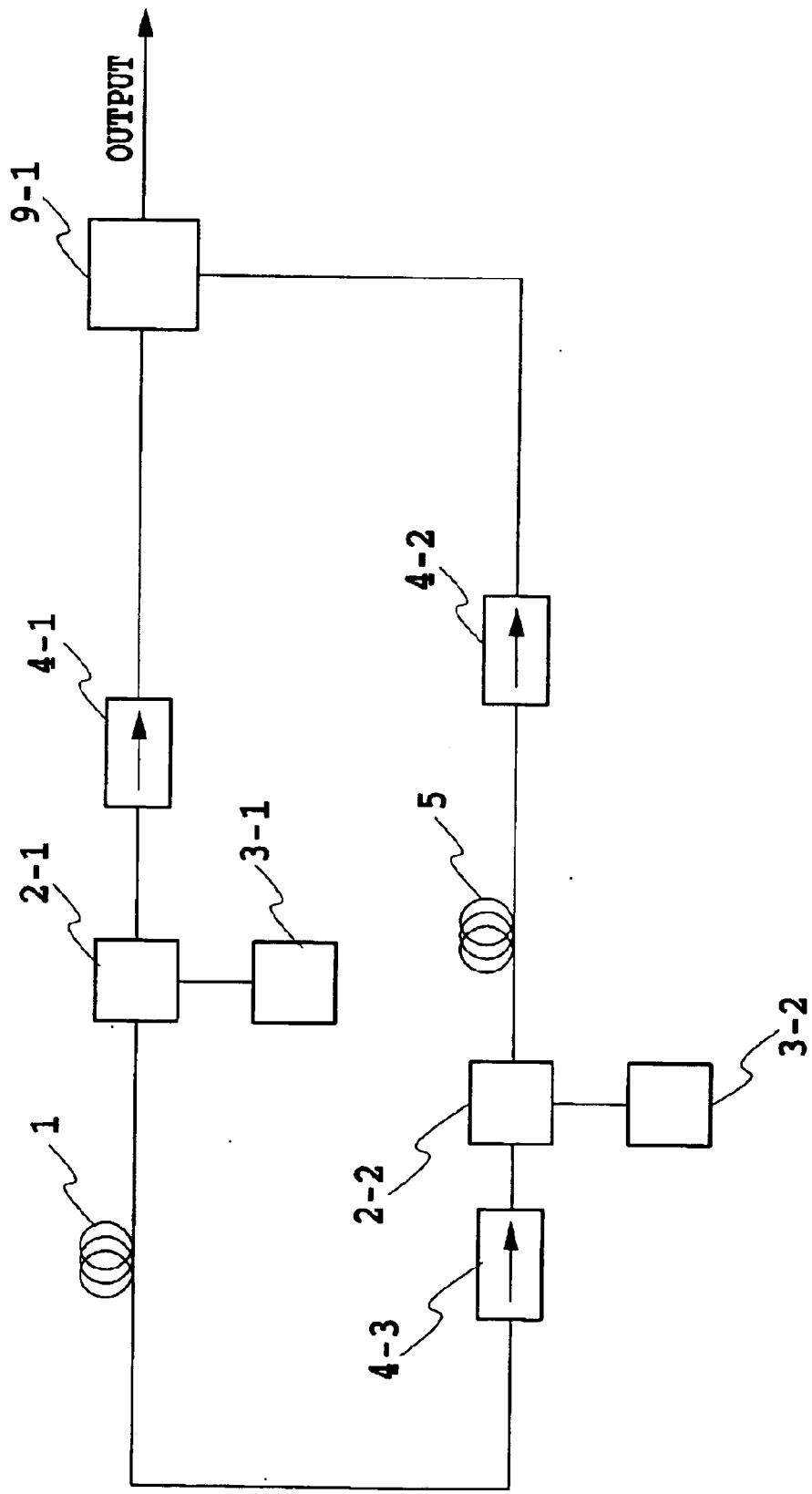
FIG. 12 is a graph showing the output spectrum of the ASE light source according to the fifth embodiment of the present invention.

FIG. 12 shows the configuration of an ASE light source according to a sixth embodiment of the present invention.

This ASE light source is different from the ASE light source according to the first embodiment in that the reflector 6 is not used and that the Tm-doped optical fibers 1 and the Er-doped optical fibers 5 are arranged in parallel. Either the Tm-doped optical fibers 1 or the Er-doped optical fibers 5 are connected to the multiplexer 2-2 via the optical isolator 4-3. The other of the two types of optical fibers is connected to the optical multiplexer 9-1.

ASE light of the S band outputted from one end of the Tm-doped optical fibers 1 excited by the excitation light source 3-1 with a wavelength of 1,400 nm is incident on the Er-doped optical fibers 5 excited by the excitation light source 3-2 with a wavelength of 980 nm. A component of a wavelength band of 1,500 to 1,530 nm, of ASE light generated from the Tm-doped optical fibers 1, is amplified. Then, the amplified component is superimposed on ASE light of the C band generated from the Er-doped optical fibers 5. The superimposed light is then outputted. The optical multiplexer 9-1 multiplexes this output and ASE light of the S band from the other end of the Tm-doped optical fibers 1, and then outputs the multiplexed light. As a result, a power density of at least −20 dBm/nm is obtained in a wavelength band of 1,450 to 1,565 nm. ASE light is thus obtained which continuously covers the S and C bands.

In the present embodiment, the reflector is not used. Consequently, laser oscillation that is not required for the ASE light source can be suppressed even if the quantity of excitation light is increased to extremely increase the internal gains of the Tm-doped optical fibers 1 and Er-doped optical fibers 5. This provides stable ASE light having a total optical output of at least 20 dBm and a stability of at most ±0.01 dB.

[Optical Amplifier According to First Embodiment]

Figure 13:
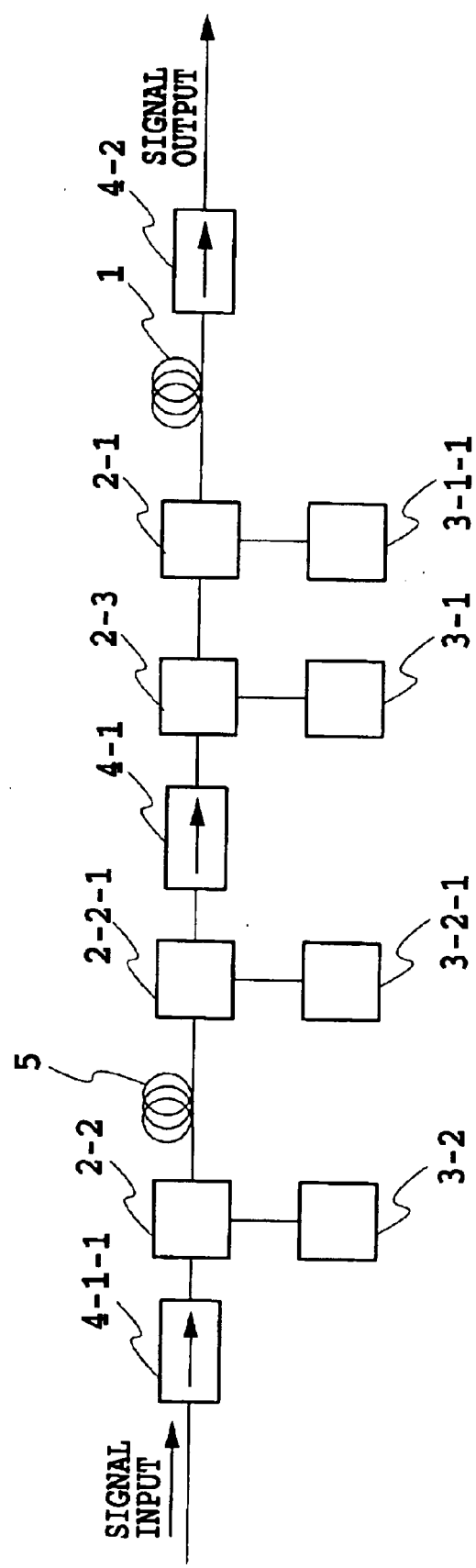
FIG. 13 is a diagram showing the configuration of an optical amplifier according to a first embodiment of the present invention.

FIG. 13 shows the configuration of an optical amplifier according to a first embodiment of the present invention. In a first stage of the optical amplifier, an optical isolator 4-1-1 connected to a signal input, the multiplexer 2-2, the Er-doped optical fibers 5, a multiplexer 2-2-1, and the optical isolator 4-1 are sequentially connected in series. The excitation light source 3-2, which is a semiconductor laser of wavelength 980 nm, is connected to the multiplexer 2-2 to execute front excitation on the Er-doped optical fibers 5. The excitation light source 3-2-1, which is a semiconductor laser of wavelength 980 nm, is connected to the multiplexer 2-2-1 to execute rear excitation on the Er-doped optical fibers 5.

In a second stage of the optical amplifier, a multiplexer 2-3 connected to the optical isolator 4-1, the multiplexer 2-1, the Tm-doped optical fibers 1, the optical isolator 4-2 connected to a signal output are sequentially connected in series. The excitation light source 3-1, which is a semiconductor laser of wavelength 1,400 nm, is connected to the multiplexer 2-3. The excitation light source 3-1-1, which is a semiconductor laser of wavelength 1,620 nm, is connected to the multiplexer 2-1. Both excitation light sources excite the Tm-doped optical fibers 1.

The optical amplifier offers a gain of at least 30 dB in a 140-nm wavelength band of 1,430 to 1,570 nm. Normally, a Tm-based gain decreases in wavelength bands of longer than 1,510 nm. An Er-based gain decreases in wavelength bands of shorter than 1,424 nm. Accordingly, it is difficult to obtain a gain of at least 25 dB. However, the optical amplifier in the present embodiment can offer a high gain even at a wavelength of 1,510 to 1,525 nm by using light of a 980-nm band to sufficiently intensely excite the $^4I_{11/2}$ level of Er ions and making the reverse distribution close to 100%.

Furthermore, by using excitation light of wavelength 1,620 nm to excite the $^3F_4$ level of Tm ions, and the population of Tm ions at the $^3H_6$ level which is a basic level substantially is zero. Then, it is possible to suppress the degradation of the noise factor resulting from the $^3H_5$–$^3F_4$ absorption transition, which is marked at a wavelength of 1,510 nm or more. The gain also increases. Excitation light of wavelength 1,400 nm acts to make a reverse distribution between the $^3H_4$ and $^3F_4$ levels on the basis of the $^3F_4$–$^3H_4$ transition. The Er-doped optical fibers 5 are arranged before the Tm-doped optical fibers 1 because the Er-doped optical fibers 5 can amplify light in a wavelength band of at least 1,510 nm to offer a high gain, while reducing noise. Therefore, this configuration enables the noise factor to be reduced to 8 dB or less in the wavelength band of 1,430 to 1,570 nm.

The concentration of Tm doped in the Tm-doped optical fibers 1 is desirably at most 4,000 ppm. If the dope concentration is higher than 4,000 ppm, the cross relaxation among Tm particles is significant. Accordingly, quantum efficiency decreases to make it difficult to offer a gain in a wavelength band longer than 1,470 nm. Furthermore, the noise factor increases at a wavelength of 1,510 nm or more. Consequently, the wide band characteristic of the amplifying function is lost. In view of the background loss of the optical fibers, a dope concentration of 500 to 3,000 ppm is most preferable and enables efficient optical amplification over a wide band.

[Optical Amplifier According to Second Embodiment]

Figure 14:
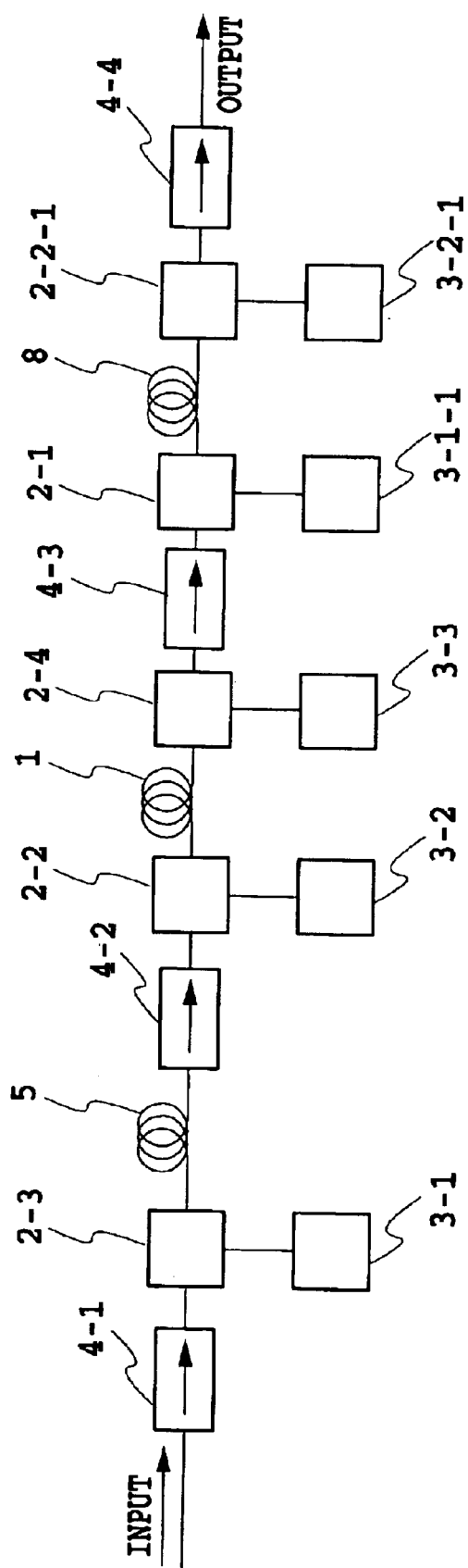
FIG. 14 is a diagram showing the configuration of an optical amplifier according to the second embodiment of the present invention.

FIG. 14 shows the configuration of an optical amplifier according to a second embodiment of the present invention. In a first stage of this optical amplifier, the optical isolator 4-1 connected to the signal input, the multiplier 2-3, the Er-doped optical fibers 5, and the optical isolator 4-2 are sequentially connected together in series. The Er-doped optical fibers 5 are composed of quartz and contain 500 ppm of Er doped in a core. The Er-doped optical fibers 5 have a fiber length of 5 m.

In a second stage of this optical amplifier, the multiplier 2-2 connected to the optical isolator 4-2, the Tm-doped optical fibers 1, the multiplier 2-4, and the optical isolator 4-3 are sequentially connected together in series. The Tm-doped optical fibers 5 are composed of a Zr-based fluoride and contain 6,000 ppm of Tm doped in a core. The Tm-doped optical fibers 1 have a fiber length of 7 m.

In a third stage of this optical amplifier, the multiplier 2-1 connected to the optical isolator 4-3, the Er-doped optical fibers 8, the multiplier 2-2-1, and the optical isolator 4-4 are sequentially connected together in series. The Er-doped optical fibers 8 are composed of quartz and contain 500 ppm of Er doped in a core. The Er-doped optical fibers 8 have a fiber length of 20 m.

Semiconductor lasers having a 980-nm band of oscillation wavelengths that can excite the $^4I_{11/2}$ level of Er are used as the excitation light sources 3-1, 3-1-1, and 3-2-1 to carry out excitation so as to offer an output of about 120 mW. The excitation light sources 3-2 and 3-3 are semiconductor lasers of wavelength 1,400 nm that carry out excitation so as to offer an output of about 200 mW.

Figure 15:
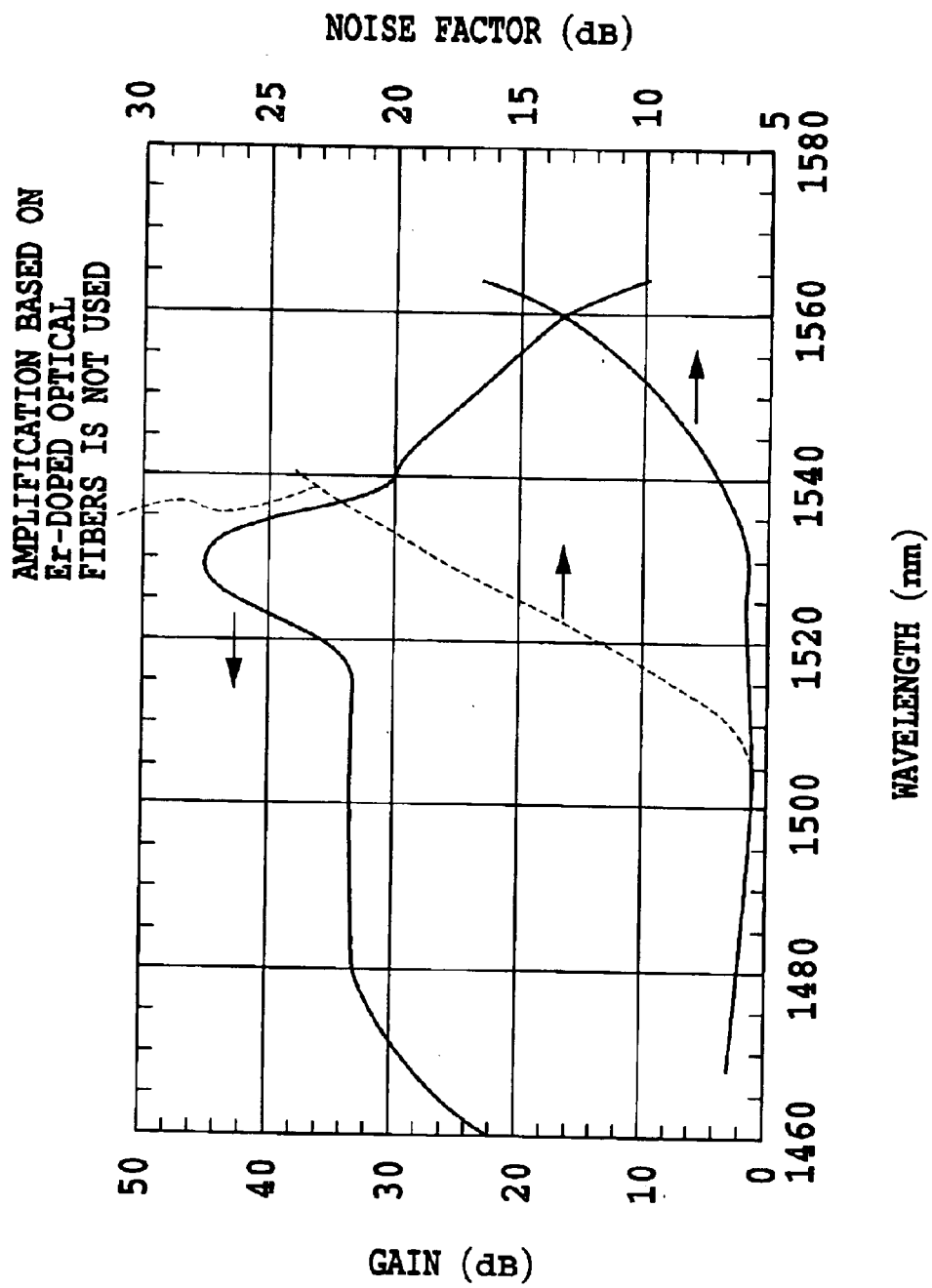
FIG. 15 is a graph showing the gain spectrum of an optical amplifier according to the second embodiment of the present invention.
Figure 16:
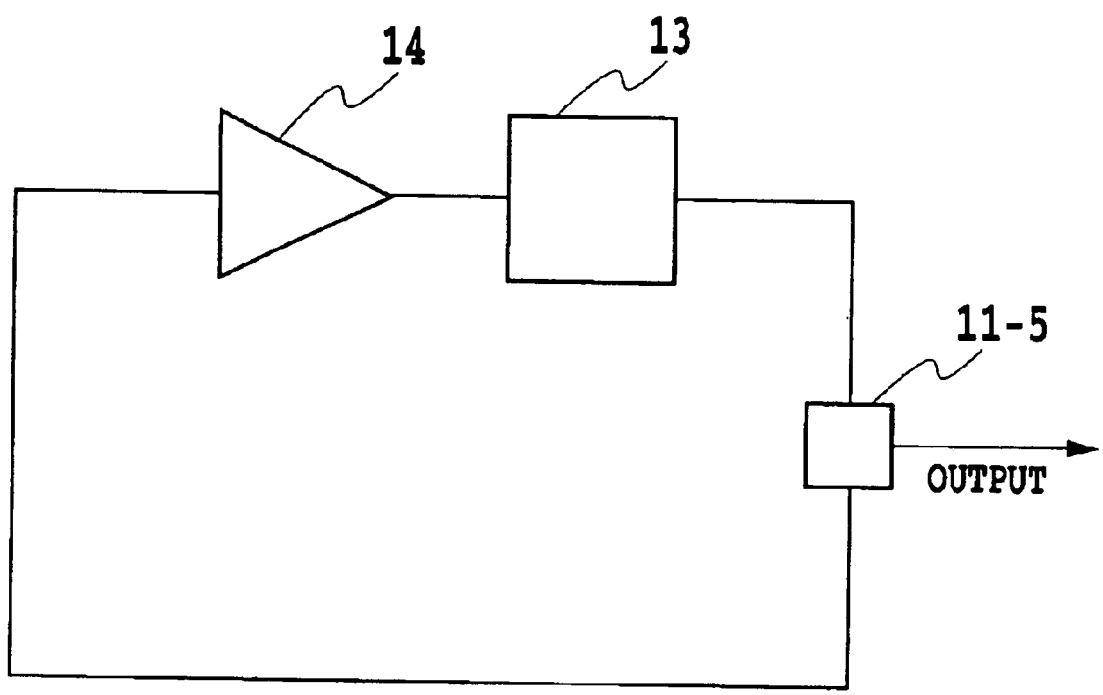
FIG. 16 is a diagram showing the configuration of a laser oscillator according to one embodiment of the present invention.

FIG. 15 shows the gain spectrum of the optical amplifier according to the second embodiment of the present invention. The optical amplifier can provide a gain of at least 20 dB in a wavelength band of 1,455 to 1,555 nm. In the prior art, in a wavelength of 1,510 to 1,520 nm, it is difficult to obtain a gain applicable to WDM transmissions using an optical fiber amplifier in which rare earth is doped. However, the present embodiment enables such an amplifier to be put to practical use.

The optical amplifier has a gain deviation of at most ±0.5 dB and a noise factor of at most 6 dB in a 35 nm wavelength band of 1,480 to 1,515 nm. This enables the gain to be efficiently flattened without using any gain equalizers. If amplification is carried out without using the first stage of the optical amplifier, including the Er-doped optical fibers 5, then the noise factor increases from a point close to a wavelength of 1,505 nm as shown by the dotted line in FIG. 15. Accordingly, this method is difficult to apply to optical transmission systems. However, it is appreciated that the provision of the first stage of the optical amplifier serves to reduce the noise factor in a wavelength band of at least 1,505 nm.

The concentration length product of the Er-doped optical fibers 5 is desirably smaller than that of the Er-doped optical fibers 8. This is because the Er-doped optical fibers can be effectively used to suppress an increase in noise factor resulting from the absorption of a signal excited state caused by the $^4I_{13/2}$–$^4I_{9/2}$ transition, which increase is significant at a wavelength shorter than 1,480 nm. The Er-doped optical fibers 5 and 8 may be composed of a fluoride or tellurite.

[Laser Oscillator]

FIG. 6 shows the configuration of a laser oscillator according to one embodiment of the present invention. In this laser oscillator, a wavelength-variable band pass filter 13 is connected to the signal output of the optical amplifier 14, shown in FIG. 13. A tap 11-5 with a split ratio of 90:10 is connected to an output of the band pass filter 13. One output of the tap 11-5 is connected to the signal input of the optical amplifier 14.

This configuration causes laser oscillation at a wavelength of 1,430 to 1,570 nm, thus offering an optical output with an emission intensity of at least 0 dBm.

INDUSTRIAL APPLICABILITY

According to the present invention, an ASE light source can be implemented which con continuously cover the S, C, and L bands. It is thus possible to provide an advantageous light source for characteristic evaluations or optical measurements of optical parts.

Furthermore, according to the present invention, an optical amplifier can be implemented which can operate at a wavelength of 1,510 to 1,525 nm so as to offer a high gain while reducing noise.

Moreover, according to the present invention, a laser oscillator can be implemented which can switch between the S band and the C band. It is thus possible to economize wavelength-variable lasers, which have been expensive. This contributes to the diffusion of optical measuring techniques using wavelength-variable light sources.

What is claimed is:

1. An ASE light source that uses rare earth-doped optical fibers as an optical amplification medium to output spontaneous emission light from the optical fibers, into which excitation light is introduced, said ASE light source is characterized in that:
    excitation lights of different intensities are inputted to Tm-doped optical fibers through opposite ends of the fibers, and
    spontaneous emission light generated from said Tm-doped optical fibers is inputted to said optical amplification medium.

2. An ASE light source as claimed in claim 1, further comprising an excitation light source that inputs, to said Tm-doped optical fibers, excitation light corresponding to energy between a $^3F_4$–$^3H_4$ level of Tm ions and excitation light corresponding to energy between a $^3H_6$–$^3F_4$ level.

3. An ASE light source as claimed in claim 1, further comprising an excitation light source that inputs excitation light of wavelength 1,360 to 1,445 nm to said Tm-doped optical fibers.

4. An ASE light source that uses rare earth-doped optical fibers as an optical amplification medium to output spontaneous emission light from the optical fibers, into which excitation light is introduced, said ASE light source is characterized by comprising:
    first emission means for outputting spontaneous emission light generated from Tm-doped optical fibers; and
    second emission means for outputting amplified light obtained by using Er-doped optical fibers to amplify the output from the first emission means and spontaneous emission light generated from said Er-doped optical fibers so that the amplified light and the spontaneous emission light are superimposed on each other.

5. An ASE light source as claimed in claim 4, further comprising an excitation light source that inputs, to said Tm-doped optical fibers, excitation light corresponding to energy between a $^3F_4$–$^3H_4$ level of Tm ions and excitation light corresponding to energy between a $^3H_6$–$^3F_4$ level.

6. An ASE light source as claimed in claim 4, further comprising an excitation light source that inputs excitation light of wavelength 1,360 to 1,445 nm to said Tm-doped optical fibers.

7. An ASE light source as claimed in claim 4, wherein excitation lights of different intensities are inputted to said Tm-doped optical fibers through their opposite ends, and said Tm-doped optical fibers generate spontaneous emission light.

8. An ASE light source as claimed in claim 4, wherein said Tm-doped optical fibers comprise fluoride glass as a base material in which Tm ion is doped.

9. An ASE light source as claimed in claim 5, wherein excitation lights of different intensities are inputted to said Tm-doped optical fibers through their opposite ends, and said Tm-doped optical fibers generate spontaneous emission light.

10. An ASE light source as claimed in claim 6, wherein excitation lights of different intensities are inputted to said Tm-doped optical fibers through their opposite ends, and said Tm-doped optical fibers generate spontaneous emission light.

11. An ASE light source as claimed in claim 8, wherein said Tm-doped optical fibers have a concentration length product of at least 30,000 ppm·m and at most 100,000 ppm·m and a Tm concentration of at least 1,000 ppm and at most 8,000 ppm.

12. An ASE light source as claimed in claim 4, wherein said Er-doped optical fibers of said second emission means are made of any one of quartz glass, fluoride glass, and tellurite glass as a base material in which Er ion is doped.

13. An ASE light source as claimed in claim 4, comprising:
    third emission means for outputting spontaneous emission light generated from the Er-doped optical fibers; and
    first multiplexing means for multiplexing the output from said second emission means and an output from said third emission means to provide a multiplexed output.

14. An ASE light source as claimed in claim 13, wherein said Er-doped optical fibers of said third emission means is made of any one of quartz glass, fluoride glass, and tellurite glass as a base material in which Er ion is doped.

15. An ASE light source as claimed in claim 13, comprising:
    fourth emission means for outputting spontaneous emission light generated from the Er-doped optical fibers; and
    second multiplexing means for multiplexing the output from said third emission means and an output from said fourth emission means to provide a multiplexed output.

16. An ASE light source as claimed in claim 15, wherein said second emission means has an excitation light source that inputs excitation light corresponding to energy between a 4I15/2–4I13/2 level of Er ions, to said Er-doped optical fibers, and
comprises a splitter that splits an output from said second emission means and inputs the split output to said third emission means as excitation light.

17. An ASE light source as claimed in claim 13, wherein said second emission means has an excitation light source that inputs excitation light of wavelength 1,350 to 1,455 nm to said Er-doped optical fibers, and
comprises a splitter that splits an output from said second emission means and inputs the split output to said third emission means as excitation light.

18. An ASE light source as claimed in claim 14, comprising:
fourth emission means for outputting spontaneous emission light generated from the Er-doped optical fibers; and
second multiplexing means for multiplexing the output from said third emission means and an output from said fourth emission means to provide a multiplexed output.

19. An ASE light source as claimed in claim 14, wherein said second emission means has an excitation light source that inputs excitation light corresponding to energy between a 4I15/2–4I13/2 level of Er ions, to said Er-doped optical fibers, and
comprises a splitter that splits an output from said second emission means and inputs the split output to said third emission means as excitation light.

20. An ASE light source as claimed in claim 14, wherein said second emission means has an excitation light source that inputs excitation light of wavelength 1,350 to 1,455 nm to said Er-doped optical fibers, and
comprises a splitter that splits an output from said second emission means and inputs the split output to said third emission means as excitation light.

21. An ASE light source as claimed in claim 18, wherein said Er-doped optical fibers of said fourth emission means is made of any one of quartz glass, fluoride glass, and tellurite glass as a base material in which Er ion is doped.

22. An ASE light source that uses rare earth-doped optical fibers as an optical amplification medium to output spontaneous emission light from the optical fibers, into which excitation light is introduced, said ASE light source is characterized by comprising:
first emission means for outputting spontaneous emission light generated from the Tm-doped optical fibers;
second emission means for outputting amplified light obtained by using Er-doped optical fibers to amplify one of the outputs from the first emission means and spontaneous emission light generated from said Er-doped optical fibers so that the amplified light and the spontaneous emission light are superimposed on each other; and
multiplexing means for multiplexing the other output from said first emission means and the output from said second emission means to provide a multiplexed output.

23. An optical amplifier which uses optical fibers as an optical amplification medium and which introduces signal light and excitation light into the optical amplification medium to amplify the signal light, said optical amplifier is characterized by comprising:
first amplifying means for using Er-doped optical fibers to amplify said signal light and then output the amplified signal light; and
second amplifying means for using Tm-doped optical fibers to amplify the output from the first amplifying means and then output the amplified output, said second amplifying means has an excitation light source that inputs, to said Tm-doped optical fibers, excitation light corresponding to energy between a $^3F_4$–$^3H_4$ level of Tm ions and excitation light corresponding to energy between a $^3H_6$–$^3F_4$ level.

24. An optical amplifier as claimed in claim 23, wherein said Tm-doped optical fibers have a Tm concentration of 500 to 3,000 ppm.

25. An optical amplifier which uses optical fibers as an optical amplification medium and which introduces signal light and excitation light into the optical amplification medium to amplify the signal light, said optical amplifier is characterized by comprising:
first amplifying means for using Er-doped optical fibers to amplify said signal light and then output the amplified signal light;
second amplifying means for usin Tm-doped optical fibers to amplify the output from the first amplifying means and then output the amplified output, said second amplifying means has an excitation light source that inputs, to said Tm-doped optical fibers, excitation light corresponding to energy between a $^3F_4$–$^3H_4$ level of Tm ions; and
third amplifying means for amplifying an output from said second amplifying means using the Er-doped optical fibers and outputting the amplified output.

26. An optical amplifier as claimed in claim 25, wherein the Er-doped optical fibers of said first amplifying means has a concentration length product smaller than that of the Er-doped optical fibers of said third amplifying means.

27. A laser oscillator comprising:
an optical amplifier having first amplifying means for using Er-doped optical fibers to amplify signal light and then output the amplified signal light and second amplifying means for inputting the output from the first amplifying means to Tm-doped optical fibers to amplify the output from the first amplification means using excitation light and then output the amplified output;
a filter connected to an output of the optical amplifier; and
splitting means connected to an output of the filter to input one of its outputs to the optical amplifier.

* * * * *